United States Patent [19]

Geiszler

[11] Patent Number: 5,221,831
[45] Date of Patent: Jun. 22, 1993

[54] FLAP-TYPE PORTAL READER

[75] Inventor: Theodore D. Geiszler, Los Gatos, Calif.

[73] Assignee: Indala Corporation, San Jose, Calif.

[21] Appl. No.: 798,713

[22] Filed: Nov. 29, 1991

[51] Int. Cl.$^5$ .......................... G06K 9/00; H04Q 9/00
[52] U.S. Cl. .................................... 235/440; 235/449;
235/443; 340/572; 340/825.54
[58] Field of Search ............... 235/440, 439, 449, 443,
235/385; 340/572, 825.54, 825.35

[56] References Cited

U.S. PATENT DOCUMENTS

| | | | |
|---|---|---|---|
| 3,983,578 | 9/1976 | Price | 360/2 |
| 4,322,614 | 3/1982 | Sloan et al. | 235/475 |
| 4,613,747 | 9/1986 | McCarthy | 235/477 |
| 4,673,932 | 6/1987 | Ekchian et al. | 340/825.54 |
| 4,704,518 | 11/1987 | Brunn et al. | 235/480 |
| 4,788,419 | 11/1988 | Walters et al. | 235/381 |
| 4,818,855 | 4/1989 | Mongeon et al. | 235/440 |
| 4,862,160 | 8/1989 | Ekchian et al. | 340/825.54 |
| 5,099,227 | 3/1992 | Geiszler et al. | 235/440 |
| 5,120,947 | 6/1992 | Petch et al. | 235/476 |
| 5,146,204 | 9/1992 | Zhou et al. | 340/572 |

FOREIGN PATENT DOCUMENTS

| | | | |
|---|---|---|---|
| 0131812 | 1/1985 | European Pat. Off. | 360/2 |
| 2-28786 | 1/1990 | Japan | 235/475 |

Primary Examiner—Carolyn E. Fields
Assistant Examiner—Drew A. Dunn
Attorney, Agent, or Firm—Spencer, Frank & Schneider

[57] ABSTRACT

Apparatus for selectively reading or writing data on a magnetic data stripe on a data card which is thin and flexible and for selectively returning or capturing the card. The apparatus includes a card guide arrangement comprising a cylindrical card guide path section, an entrance card path section with an entrance slit for admitting the data card, and an exit path section with an exit slit for discharging the data card for capture. A drive arrangement drives the data card through the entrance slit, throughout the cylindrical card guide path section, and through the exit slit. A transducer with a read head and write head is mounted relative to the cylindrical card guide path section. A position tracking arrangement determines the position of the data card within the cylindrical card guide and a card-in sensor senses the presence of a data card in the entrance path section. A microprocessor based control circuit is used to operate the system and control operational features.

27 Claims, 3 Drawing Sheets

FLAP-TYPE PORTAL READER

BACKGROUND OF THE INVENTION

The invention relates to an arrangement in the form of a portal positioned along a pathway for reading a transponder type device or tag attached to an object moving along the pathway through the portal. More particularly, the present invention relates to a portal reading arrangement for reading a preferably passive transponder type device or tag which is excited by an inductively coupled magnetic field of a first predetermined frequency to produce a magnetic and/or an electrostatic field of a second predetermined frequency modulated with a coded identifying signal which is inductively received and decoded by a receiver. Proximity type systems generally operating in this manner are disclosed for example in commonly owned U.S. Pat. No. 4,818,855 and copending allowed U.S. application 07/453 271, filed Dec. 18th, 1989 now U.S. Pat. No. 5,099,727, the subject matter of which is incorporated herein by reference.

It is known to use systems of the above general type for the identification of objects moving along a pathway, for example, a conveyor belt or an animal walkway, for the purpose of identifying and/or controlling the movement of the object along the pathway as a result of the readout identification. In such systems, the transponder type device or tag is generally affixed to the object with a known orientation and position, and one or more readers are positioned along the pathway, for example above, below and/or to the side of the pathway, depending on the desired or known orientation of the tag on the object. While these systems operate satisfactorily when the orientation and/or position of the tag on the object is generally known, reading problems may occur if the tag is randomly oriented or randomly positioned. These reading problems may be caused for example because the tag has not been excited to produce an output signal, or because the output signal received by the receiving antenna is too weak. These problems generally occur because of the directional nature of the coupling mechanisms involved, and in particular the inductive magnetic field coupling used to excite the transponder or tag and/or to provide the received output signal. Additional reading problems can result due to the size, and thus the positioning of the tags relative to the readers, and/or due to the material from which the object is formed. For example, in the case of a metal object with a random orientation, the tag may be effectively shielded from the reading devices.

One type of pathway or conveyor system wherein automatic reading of tags affixed to objects moving along the conveyor would be most desirable is the baggage handling conveyor systems of the type commonly used, for example, by airlines at airports. As can easily be appreciated, the baggage or luggage transported by such conveyor systems is random in shape and material of construction, and is randomly oriented on the conveyor, often with little space between individual pieces of luggage. Thus, identifying tags fastened to the individual piece of luggage, for example tags indicating destination, flight or ownership, are likewise randomly oriented and positioned, thus rendering automatic reading of the tags most difficult.

At the present time identifying tags affixed to luggage in luggage conveying systems are either manually read or semimanually read by means of hand held optical scanners. Obviously, it would be desirable to provide an automatic system, and in particular a portal reader which could automatically read transponder type devices or tags containing the desired information irrespective of the orientation of the tags in such a baggage conveyor system. However, to be applicable, such a portal reader should be able to read the tags on the first try with a substantial degree of accuracy, e.g. close to 100% and the tags must be read in the same sequence as they appear on the conveyor. Additionally, the reader must be capable of reading the tags in all orientations, even if the tags disposed under the luggage, and should be capable of readings tags disposed on metal luggage, which tends to be most difficult in view of the shielding effect produced by the metal of the luggage.

SUMMARY OF THE INVENTION

It is an object of the present invention to provide an improved reading device for reading transponder type devices or tags of the above identified type attached to an object moving along a pathway through the portal.

It is a further object of the invention to provide an improved portal type reading device which is capable of reading transponder type devices or tags using proximity detection techniques while the tags are attached on an object moving along a pathway through the portal irrespective of the orientation of the tag.

The above objects are generally achieved according to a first aspect of the invention by an apparatus for automatically reading a passive transponder type tag, which is responsive to receipt of a magnetic exciting field of a first predetermined frequency to produce at least one of a magnetic and an electrostatic field of a second different predetermined frequency modulated by a digitally coded identifying signal, while the tag is attached to an object moving along a given pathway; which apparatus comprises: means for producing a magnetic exciting field of the first predetermined frequency along a portion of the length of the pathway; a curtain, formed of a plurality of flexible flaps of nonconductive material, suspended from above the portion of the pathway and extending across the pathway, with the plurality of flaps being positioned, and being of a length, such that at least one of the flaps will be contacted and deflected by an object having an attached tag moving along the pathway; at least one of an electrostatic field receiving antenna and a magnetic field receiving antenna disposed in each of the flaps; and means connected to each of the receiving antennas for receiving and decoding a signal of the second predetermined frequency received by the respective the antennas.

Preferably the tag simultaneously produces both a magnetic field and an electrostatic field modulated with the coded identifying signal, and at least some of the flaps contain both a magnetic field receiving antenna and an electrostatic field receiving antenna.

According to features of this aspect of the invention each electrostatic antenna comprises a length of wire extending along the length of the respective flap and connected at its upper end to the means for receiving, each magnetic field receiving antenna includes a coil disposed in a respective flap, with respective leads extending along the length of the respective flap and connecting the respective ends of the coil to the means for receiving, at least some of the flaps further include an excitor coil for the means for producing a magnetic field of the first predetermined frequency.

Moreover, according to the preferred feature of the invention, the pathway is a conveyor belt for conveying an object to which the tag is attached and may be randomly oriented, and the means for producing a magnetic exciting field comprises at least two exciting coils disposed orthogonally about the portion of the conveyor belt for generating respective magnetic fields disposed orthogonal to the direction of movement of the conveyor belt.

The above objects are achieved according to a preferred embodiment of the invention by a portal for automatically exciting and reading a passive transponder type tag, which is excited by an inductively coupled signal of a first predetermined frequency and which simultaneously produces a magnetic field and an electrostatic field modulated with a digitally coded identifying signal, while the device is moving along a substantially horizontal conveyor belt, which portal comprises: a rectangular frame for placement around a portion of a substantially horizontal conveyor belt in a direction transverse to the direction of movement of the conveyor belt; means for producing a magnetic field of the first predetermined frequency within the interior of the frame with this means including first, second, third and fourth exciter coils mounted respectively on an upper, a lower and respective side panels forming the walls of the frame, and oscillator and driver circuit means, connected to each of the exciter coils, for producing a signal of the first predetermined frequency; a curtain, formed of a plurality of spaced flexible rectangular flaps of non-conductive material suspended from the upper panel disposed within the frame, extending in a direction transverse to the direction of movement of the conveyor belt, and being of a length such that at least one of the flaps will be contacted and deflected by an object moving along the conveyor belt; a pickup coil, serving as a magnetic field receiving antenna, and an electrostatic field receiving antenna disposed in each flap; and receiver means, connected to each pickup coil and each electrostatic field receiving antenna, for detecting a coded signal of the second frequency received by any of the pickup coils and electrostatic receiving antennas.

Preferably, a respective further pickup coil, serving as a magnetic field receiving antenna, is disposed on each of the panels of the frame adjacent respective ones of the exciter coils, with the axes of the further pickup coils being orthogonal to the axes of the pickup coil in the flaps.

According to features of the preferred embodiment of the invention, the above mentioned pickup coils in the flaps are disposed near the center of the length of the flaps; a respective further exciter coil may be disposed in each flap adjacent the lower end of the respective flap and oriented orthogonal to said first, second, third and fourth exciter coils, and connected to said oscillator and driver circuit means; the oscillator and driver circuit means includes a respective separate oscillator and driver circuit for at least each of the first, second, third and fourth exciter coils, whereby at least the first, second, third and fourth exciter coils are asynchronously driven; and another magnetic field pickup coil may be disposed in each flap within and concentric with the adjacent further exciter coil, and connected in parallel with the associated pickup coil in the respective flap.

According to still further features of the preferred embodiment of the invention, the first, second, third and fourth exciter coils are flat loop coils, with the two of the pickup coils on the side surfaces being oriented parallel to one another and orthogonal to the two of the pickup coils on the top and bottom surfaces which are likewise parallel to one another; each of the pickup coils mounted on the panels of the frame is concentric with and disposed within the adjacent one of the exciter coils; the means for receiving and decoding includes a separate receiver connected to each of the pickup coils, and the curtain contains four flaps, with the means for receiving and decoding including a respective separate receiver connected to the electrostatic antennas of the two inner flaps and to the electrostatic antennas of the two outer flaps.

Finally, according to still a further feature of the invention, a pre-reader comprising a rectangular panel containing a further exciter coil for the first predetermined frequency and a further magnetic field pickup coil for receiving a coded signal of the second predetermined frequency may be disposed in front of the frame in the direction of travel of the conveyor belt and with the rectangular panel being positioned so that it is substantially coplanar and parallel to the lower panel of the frame, with this further exciter coil being an elongated loop coil extending in a direction transverse to the direction of travel of the conveyor belt and of a width in the direction of travel of the conveyor belt to produce a magnetic field transverse to the direction of conveyor belt travel which is narrow relative to the magnetic fields produced by the first, second, third and fourth exciting coils.

DETAILED DESCRIPTION OF THE PREFERRED EMBODIMENTS

Figure 1:
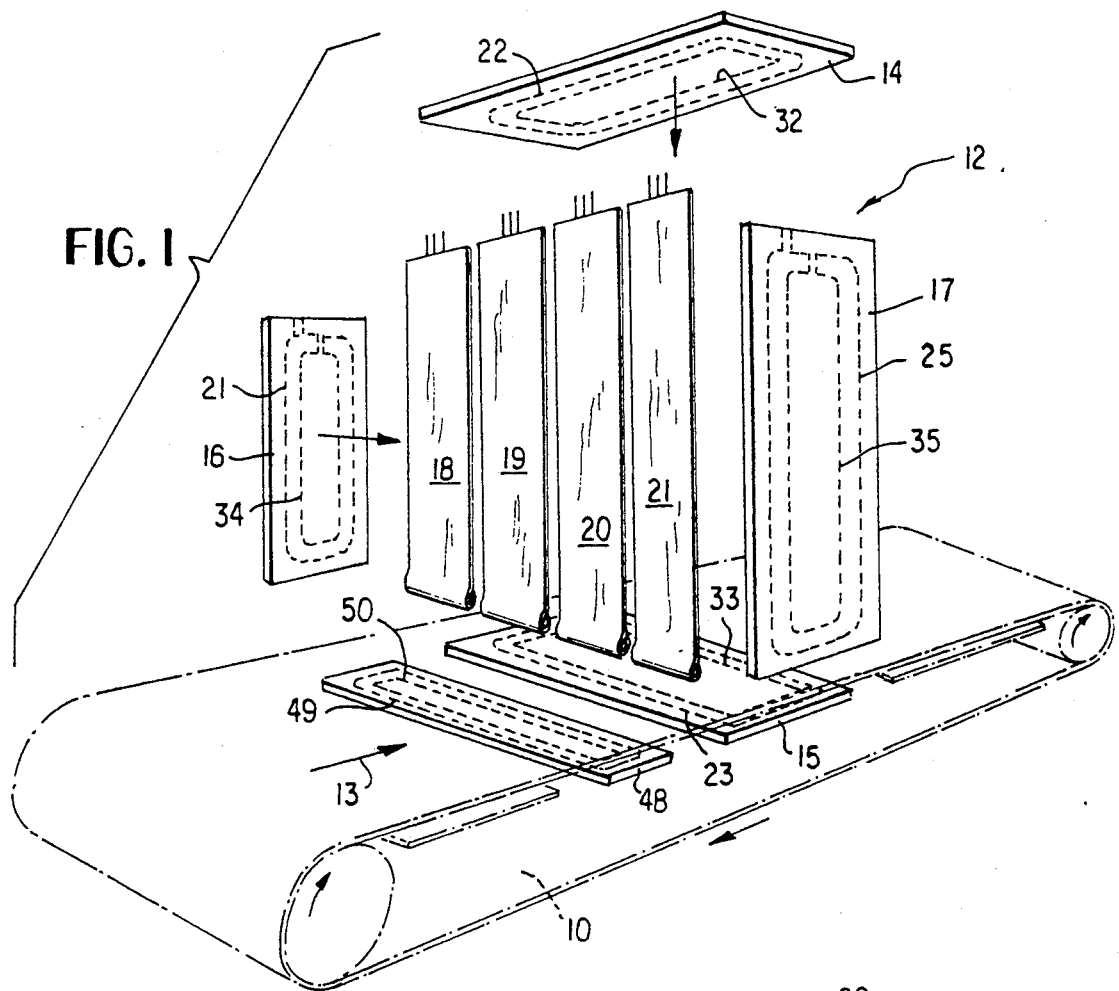
FIG. 1 is a schematic isometric view of a preferred embodiment of a flap-reader type portal according to the invention for a conveyor belt with the panels of the portal shown in an exploded view for the sake of clarity.
Figure 2:
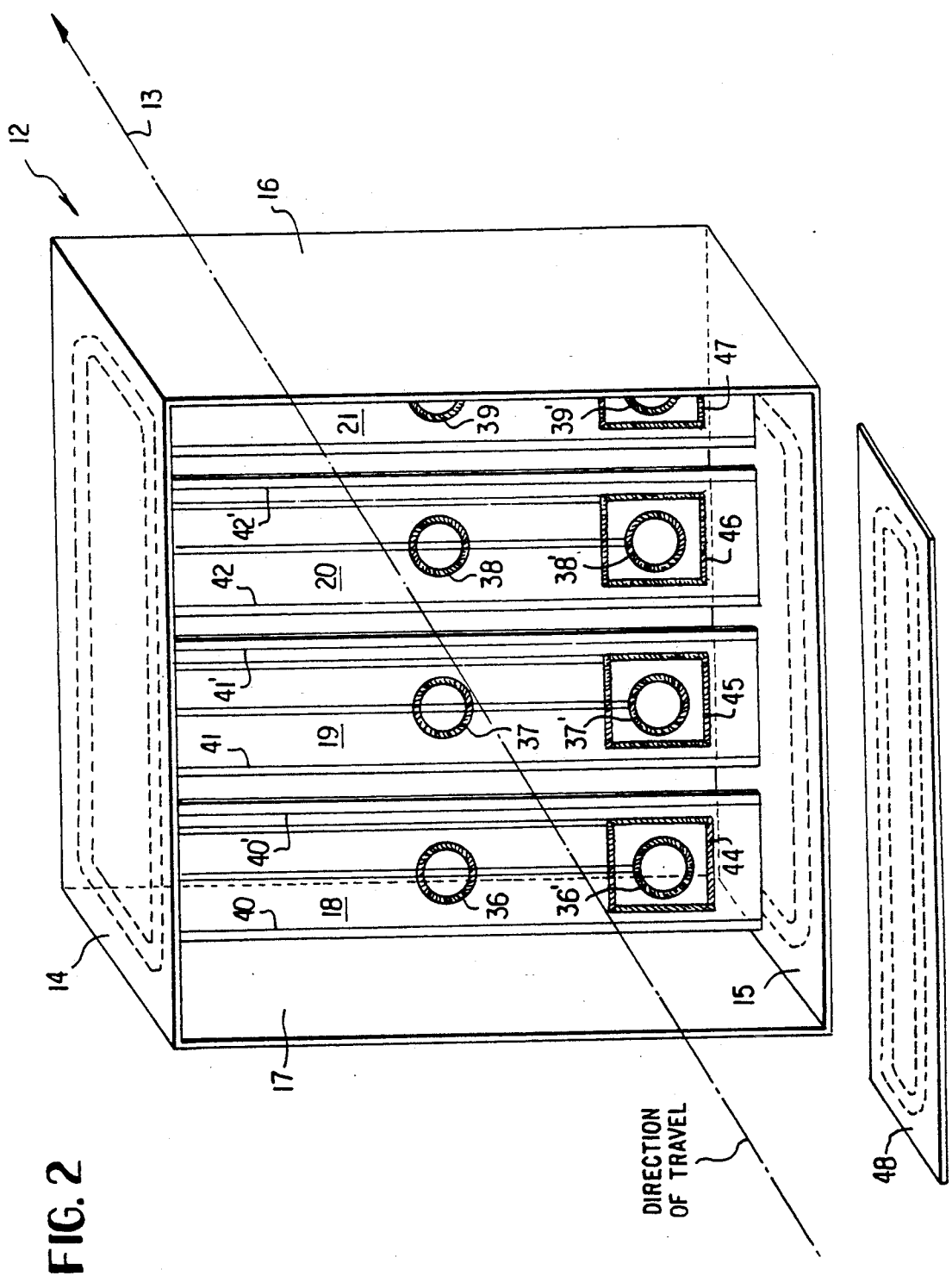
FIG. 2 is a schematic isometric view of the flap reader type portal of FIG. 1 showing the details of the content of the flaps.

Referring now to FIGS. 1 and 2, there is shown a conveyor 10 provided with a portal type reader 12 according to the present invention for the purpose of the proximity reading tags attached to luggage, which tags are of the type which are excited by a magnetic field of a first predetermined frequency and which produce a carrier signal of a second predetermined frequency modulated with an identifying code stored in the tag and which simultaneously radiates or transmits the modulated carrier signal by both a magnetic coupling field and an electrostatic coupling field. Such a tag is disclosed in the above identified allowed copending U.S. application No. 07/453,271, filed Dec. 18th, 1989 now U.S. Pat. No. 5,099,227.

The portal reader 12 is provided as a rectangular frame disposed transverse to the direction of movement 13 of the conveyor 10. The frame 12 is essentially composed of four rectangular panels, and in particular an upper panel 14 disposed above the conveyor belt 10, a lower panel 15 disposed below the conveyor belt 10, and opposed side panels 16 and 17 disposed on either side of the conveyor belt 10. Although the panels 14–17, in FIG. 2, are shown as in fact constituting the frame, it is to be understood that this is not absolutely required, i.e. the panels may be attached to further supporting structures (not shown) which maintain the panels in their indicated orientation, i.e. opposed panels being parallel to one another to form a rectangular frame. The portal reader 12 further includes a curtain which extends transverse to the direction of movement 13 of the conveyor belt 10 and which is formed of a plurality of elongated rectangular strips or flaps 18–21 of a flexible non-conductive material, for example rubber or a plastic such as vinyl, which are suspended from the upper panel 14 (or the supporting framework) within the frame formed by the four rectangular panels 14–17. The length of the flaps 18–21 and the number of such flaps, is such that at least one of the flaps will be contacted and deflected by an object moving along the surface of the conveyor 10.

To produce an exciting field in the area of the portal 12 for a tag moving along the conveyor belt 10, each of the panels 14–17 is provided with a large diameter exciter coil 22–25, respectively, with the coils being shown schematically. Each of the coils 22–25 is essentially a flat coil or loop of wire, with the opposing pairs of coils 22–23 and 24–25 being disposed parallel to one another and producing magnetic fields within the portal 12 which extend orthogonal to the direction of movement 13 of the conveyor belt 10.

Figure 3:
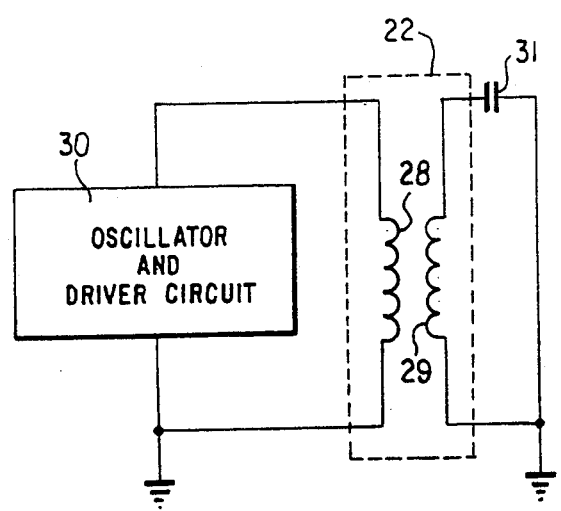
FIG. 3 is a schematic circuit showing the preferred exciting circuitry for the magnetic field exciting coils.

Although each of the exciter coils 22–25 may be a simple loop of wire which is connected to an oscillator and driver circuit for providing an exciting signal of the first predetermined or exciting frequency, as shown in FIG. 3 for the exciter coil 22 by way of example, each exciter coil 22–25 is preferably a transformer with coaxial and closely coupled loop type primary and secondary windings 28 and 29, with the primary winding 28 being connected to the oscillator and driver circuit 30 for providing the exciting frequency signal, e.g. 125 kHz, and with the secondary winding 29 being connected in parallel with a capacitor 31 to form a resonant circuit at the exciting frequency in order to provide better control for the power of the exciting fields. Although it is possible to excite all of the exciter coils 22–25 from a common oscillator and driver circuit 30, experience has shown that with such an arrangement, as well as with an arrangement wherein opposite exciter coils, for example, coils 25 and 26, are excited with in-phase signals, a so-called "hole" in the exciting field may result in the center of the portal 12, so that tags passing through the portal 12 in this position are not consistently activated. Accordingly, preferably each of the exciting coils 22–25 is connected to a separate respective oscillator and driver circuit 30, each producing the same exciting frequency, with the respective oscillator and driver circuits 30 being operated asynchronously. While such a mode of operation results in a continuously changing field strength due to the interaction of the out of phase exciting fields, it has been found that this mode of operation does assure that there is always sufficient power available from one of the exciting coils 22–25 to activate a tag located within the portal 12 regardless of its location. It should be noted that operating the fields in this manner may cause a tag to be turned on sequentially by more than one coil as it passes through the field. However, the arrangement does assure that no so-called "holes" in the exciting field within the portal 12 are present at any given time.

In order to detect the modulated magnetic field produced by an excited tag disposed within the portal 12, each of the panels 14–17 is provided with a magnetic field receiving antenna or coil 32–35 which is of a smaller diameter and concentric with the respectively associated exciter coil 22–25. Each of the receiving coils 32–35 is connected to a respective receiver arrangement, responsive to the produced carrier frequency, for detecting and decoding the received signal. However, in view of the directional nature of the magnetic coupling mechanism involved, using only the four receiving or pickup coils 32–35 results in the problem that tags located in the center of the portal may not be read. That is, while the tag may be activated or excited, its magnetic output field may not be seen by the receiving antennas or coils 32–35. This problem may, in addition to being caused by the orientation of the tag, be a result of the distance of the tags from the receiving coils or antennas and possibly cancellation of the effect of the receiving coils or antennas 32–35 in the center of the portal.

To avoid such a problem, each of the flaps 18–21 is provided, as shown in FIG. 2, with a receiving antenna for receiving the modulated carrier signal radiated by a tag, with the receiving antennas in the respective flaps being either a magnetic field receiving antenna (e.g. coil) or an electrostatic field receiving antenna (e.g., a length of straight wire). Preferably, as shown in FIG. 2, each of the flaps 18–21 is provided with both a magnetic field receiving antenna or coil 36–39, respectively, and with a pair of electrostatic field receiving antennas or lengths of wire 40–40', 41–41', 42–42' and 43–43' which extend along the respective longitudinal edges of the respective flaps 18–21. As shown, each of the magnetic field receiving antennas or coils 36–39 is preferably disposed in approximately the center of the respective flap 18–21 with the coils being oriented orthogonally to the magnetic field pickup antennas 32–35 in the panels 14–17.

As further shown in FIG. 2, and in order to ensure the ability to excite and read tags which may be attached to metal objects or pieces of luggage, and thus might tend to be shielded from the remaining sensing and receiving antenna coils, each of the flaps 18–21 is additionally provided adjacent its lower end with a further receiving coil 36'–39', respectively which is connected in parallel and similarly oriented with the associated receiving coil 36–39, and with a respective concentric exciter coil 44–47 which preferably are similar to the exciting coils 22–25 on the side panels. As can be seen, each of the exciting coils 44–47 is oriented orthogonally to the exciting coils 22–25, and thus produces fields orthogonal to those produced by the exciting coils 22–25, increasing the probability of a tag being activated regardless of its orientation. The exciter coils 44–47 may, like the coils 22–25, each be connected to a respective oscillator and driver circuit 30, or can be connected to a common oscillator and driver circuit 30.

Although the flap type portal reader as discussed above will excite tags passing through the portal irrespective of the orientation and/or type of luggage to which attached, as indicated above a tag may be read several times within the portal. Since it may occur in a luggage conveyor system that the pieces of luggage are closely spaced, it could occur that the tags of two different pieces of luggage are simultaneously within the portal 12 and being read. Since it is important in a luggage conveyor system that the sequence of the luggage being conveyed be known, such a dual reading presents a problem. To attempt to minimize such a problem, according to a further feature of the invention as shown in FIGS. 1 and 2, the portal 12 is provided with a pre-reader including a further rectangular panel 48 which, in a manner similar to panels 14–17, contains an exciting coil 49 which is concentric with and surrounds a reading coil or antenna 50. This panel 48 is disposed in front of the frame or portal 12 in the direction of travel 13 of the conveyor belt 10, and is positioned so that it is substantially coplanar and parallel to the lower panel 15. Moreover, the panel 48, and thus the exciting coil 49, have a width in the direction of travel 13 of the conveyor belt 10 to produce a magnetic field which is narrow relative to the magnetic fields , produced by the exciter coils 22–25. The exciter coil 49 is likewise connected to an oscillator and driver circuit 30 operating at the exciting frequency and the read signal received by the reading antenna 50 is detected and decoded in the normal manner to provide an additional source of information, if necessary, in the event of an ambiguity in the signals read by the receiving antennas of the portal 12 itself.

Figure 4:
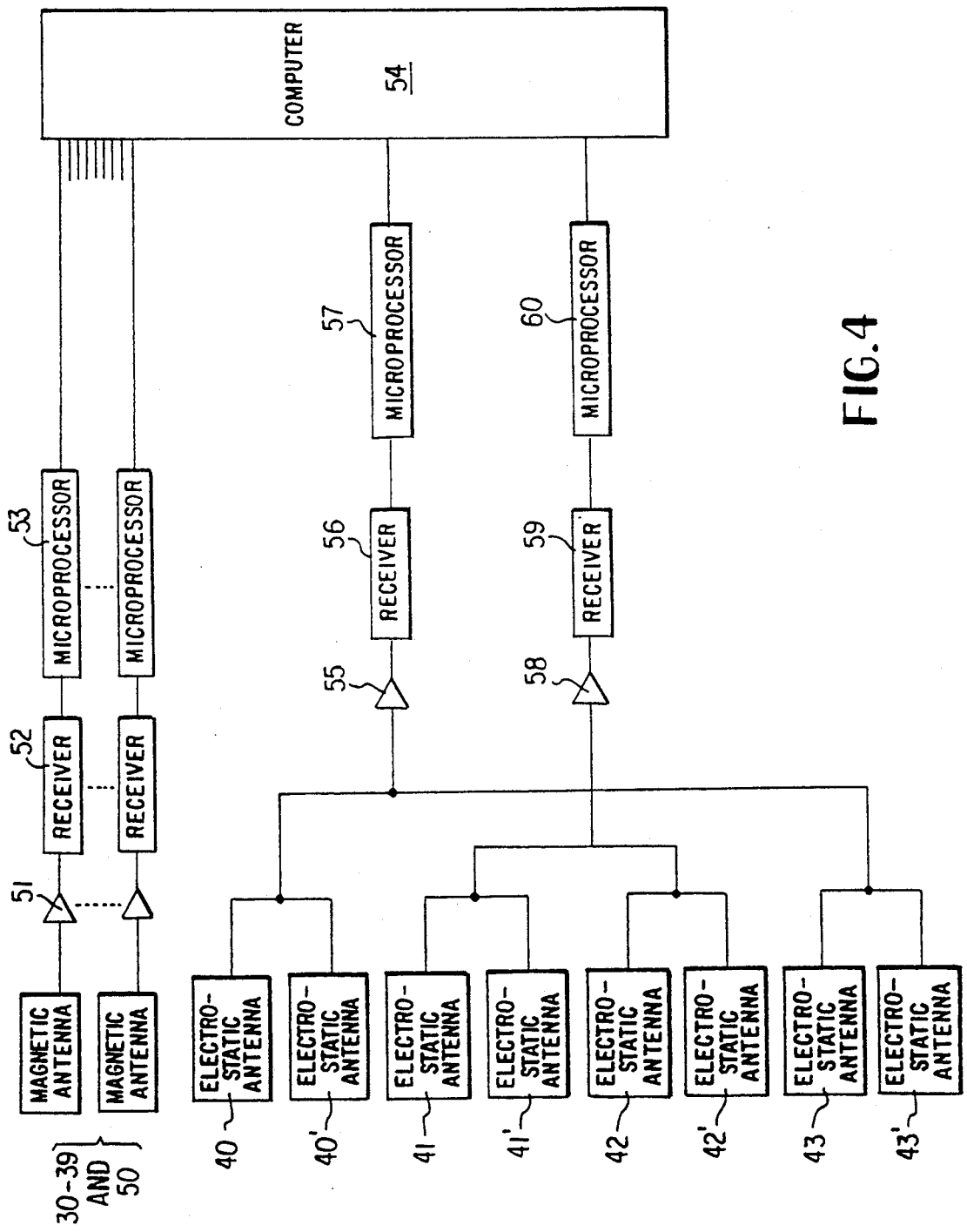
FIG. 4 is a block diagram of the preferred arrangement of the receiving circuitry for the portal of FIGS. 1 and 2.

To process the signals received by the various receiving antennas as shown in FIG. 4, each of the nine magnetic field receiving antennas 32–34, 36–39 and 50 of the flap type portal reader and prereader shown in FIGS. 1 and 2 is connected via a respective preamplifier 51, a respective receiver 52 for detecting the modulation, and a respective microprocessor 53 for decoding the coded information to a host computer 54 for processing of the decoded information and for controlling downstream operations of the conveyor system. It should be noted, however, that instead of respective receivers 52 and microprocessors 53 for each of the magnetic field receiving antennas 32–39, multiplexing techniques may be utilized to reduce the number of receivers and microprocessors. For example, a common receiver 52 and microprocessor 53 may be utilized for the receiving antennas 32–35 of the panels 14–17 and a single further receiver 52 microprocessor 53 for the magnetic field receiving antennas 36–39 of the flaps 18–21. With regard to the electrostatic antennas in the flaps 18–21, while separate signal paths to the computer may likewise be utilized, preferably as shown in FIG. 4, each pair of electrostatic antennas 40–40', 41–41', 42–42' and 43–43' are connected together at their upper ends as shown. Thereafter, the connected pair 40–40' and the connected pair 43–43' associated with the two outer flaps 18 and 21 are connected via a common preamplifier 55, receiver 56 and microprocessor 57 to the computer 54 while the antenna pairs 41–41' and 42–42' are connected together and via a further preamplifier 58, receiver 59 and microprocessor 60 to the computer 54.

Although the flap type portal reader according to the invention has been described with particular applicability for a luggage conveyor system, it is to be understood that various modifications of the preferred arrangement are possible depending on the particular use of the flap type portal reader. For example, for certain type applications it may be possible to do without the exciting coils and magnetic field receiving antennas in the panels 14–17, i.e. to use only the exciting coils and the receiving antennas in the flaps 18–21. Additionally, the disclosed flap type portal reader may, for example, be utilized without the exciter coils 44–47 in the flaps and/or with different arrangements of the receiving antennas dependent on the particular application. Accordingly, various modifications, changes and adaptations are intended to be comprehended within the meaning and range of equivalents of the appended claims.

What is claimed:

1. Apparatus for automatically reading a passive transponder type tag, which is responsive to receipt of a magnetic exciting field of a first predetermined frequency to produce at least one of a magnetic and an electrostatic field of a second different predetermined frequency modulated by a digitally coded identifying signal, while the tag is attached to a object moving along a given pathway; said apparatus comprising:

means for producing a magnetic exciting field of said first predetermined frequency along a portion of the length of the pathway;

a curtain, formed of a plurality of flexible flaps of non-conductive material, suspended from above said portion of said pathway and extending across said pathway, with said plurality of flaps being positioned, and being of a length, such that at least one of said flaps will be contacted and deflected by an object having an attached transponder moving along said pathway;

at least one of an electrostatic field receiving antenna and a magnetic field receiving antenna disposed in each of said flaps; and means connected to each of said receiving antennas for receiving and decoding a signal of the second predetermined frequency received by the respective said antennas.

2. Apparatus for selectively reading or writing data on a magnetic data stripe on a data card which is thin and flexible, said apparatus comprising:

card guide means defining a card guide path including a cylindrical card guide path section and an entrance card path section including an entrance slit for admitting said data card into said cylindrical card guide path section;

drive means for driving a data card though said entrance slit and around said cylindrical card guide path section;

transducer means, including a read head member and a write head member, positioned at a prearranged location on said cylindrical card guide path section for selectively detecting data or writing data on a least one data track on said data stripe of a data card being driven through said cylindrical card guide path section;

position tracking means for determining the position of said data card within said cylindrical card guide path section;

card-in sensor means for sensing the presence of a data card in said entrance card path section; and control circuit means coupled to said drive means, said transducer means, said position tracking means and said card-in sensor means and being operative during a card capture time period to respond to said card-in sensor means to detect the presence of a data card in said entrance card path section to turn on said drive means to drive said data card through said entrance slit and said entrance card path section into said cylindrical card guide path;

during a data scan interval to respond to said position tracking means and said transducer means to alternatively read or write data on said data card;

said entrance slit being a card-in/out slit operative during said card capture time period to admit said data card into said cylindrical card guide path and operative during a card discharge time period to allow discharge of said data card from said cylindrical card guide path;

said card guide means includes a guide claw means having a guide finger portion located at said card-in/out slit and movable between a card in-out position and a card guide position and spring means for biasing said guide finger portion toward said card in-out position, said card in-out position permitting free movement of said data card thorugh said card-in/out slit during both said card capture time period and said card discharge time period; and said guide finger portion being moved into said card guide position by the leading edge of a data card being driven around said cylindrical card guide path to provide a smooth guided movement of said data card at the position of said card-in/out slit;

said drive means comprising a bidirectional drive means for driving said data card alternatively in a forward direction to drive said data card forwards through said entrance slit and around said cylindrical card guide path thereby to scan said data stripe thereon past said transducer means and in a reverse direction to drive said data card backwards through said entrance slit to discharge said card from said card guide means; and said control means is operative during said card capture time period to turn on said drive means in a forward direction and during said card discharge time period to turn on said drive means in a reverse direction to discharge said data card through said card-in/out slit.

3. Apparatus as defined in claim 1 wherein each electrostatic antenna comprises a length of wire extending along the length of a respective flap and connected at its upper end to said means for receiving.

4. Apparatus for selectively reading or writing data on a magnetic data stripe on a data card which is thin and flexible, said apparatus comprising:
card guide means defining a card guide path including a cylindrical card guide path section and an entrance card path section including an entrance slit for admitting said data card into said cylindrical card guide path section;
drive means for driving a data card through said entrance slit and around said cylindrical card guide path section;
transducer means, including a read head member and a write head member, positioned at a prearranged location on said cylindrical card guide path section for selectively detecting data or writing data on a least one data track on said data stripe of a data card being driven through said cylindrical card guide path section;
position tracking means for determining the position of said data card within said cylindrical card guide path section;
card-in sensor means for sensing the presence of a data card in said entrance card path section; and
control circuit means coupled to said drive means, said transducer means, said position tracking means and said card-in sensor means and being operative during a card capture time period to respond to said card-in sensor means to detect the presence of a data card in said entrance card path section to turn on said drive means to drive said data card through said entrance slit and said entrance card path section into said cylindrical card guide path;
during a data scan interval to respond to said position tracking means and said transducer means to alternatively read or write data on said data card;
said apparatus further comprising:
punch and die means mounted in a position relative to said card guide means in alignment with said transducer means and being selectively operable to punch a hole in said data card at a location on a data track on said magnetic data stripe thereon;
and said control means is coupled to said punch and die means and is operative during a hole punching time period to operate said drive means to drive said data card to a prearranged data card position based on the output of said position tracking means and thereafter to operate said punch and die means to punch a hole in said data card.

5. Apparatus as defined in claim 4 wherein: said transponder type device simultaneously produces both a magnetic field and an electrostatic field modulated with the coded signal; at least some of said flaps contain both a magnetic field receiving antenna and an electrostatic field receiving antenna; and said electrostatic field receiving antenna is a length of wire extending along the length of the associated flap.

6. Apparatus as defined in claim 5 wherein at least some of said flaps further include an excitor coil for said means for producing a magnetic field of said first predetermined frequency.

7. Apparatus as defined in claim 1 wherein said flaps are laminated sheets of plastic with the associated said antennas being disposed between the plastic sheets.

8. Apparatus as claimed in claim 2, further comprising
punch and die means mounted in a position relative to said card guide means in alignment with said transducer means and being selectively operable to punch a hole in said data card at a location on a data track on said magnetic data stripe thereon;
and said control means is coupled to said punch and die means and is operative during a hole punching time period to operate said drive means to drive said data card to a prearranged data card position based on the output of said position tracking means and thereafter to operate said punch and die means to punch a hole in said data card.

9. Apparatus as claimed in claim 2, wherein
said position tracking means is a tachometer means mounted in a prearranged position relative to said cylindrical card guide path section with a drive wheel positioned to contact one edge portion of said data card being driven therethrough, said tachometer means producing a sequence of output pulses in response to rotation of said drive wheel;
said control circuit means includes a tachometer count register, means for initializing said tachometer count register to a data value corresponding to a card length value comprising substantially the number of output pulses expected from said tachometer means when driven by the entire length of said data card, and means for decrementing the data value in said tachometer count register in response to said output pulses from said tachometer means.

10. Apparatus as claimed in claim 9, further comprising
a punch and die means mounted in a prearranged relationship to said card guide means in alignment with said transducer means for punching a hole in said magnetic data stripe along one data track thereon; and
and wherein said control means is interfaced to said punch and die means during a hole punching time period and includes
means for setting a punch location count corresponding to the desired position of a hole to be punched by said punch and die means; and
punch control means for operating said drive means to drive said data card forward through said cylindrical card guide path section until the data value in said tachometer count register is equal to said punch location count, stopping said drive means, and then operating said punch and die means to punch a hole in said data card at a position corresponding to said punch location count.

11. Apparatus as claimed in claim 10, adapted for use with a prepaid card type of data card which includes a value data track located on one magnetic strip on a back side of said data card, said value data track carrying data corresponding to the current value of said data card and having on a front side of said data card a visually readable value indicating gage substantially aligned with said value data track, said transducer means having a read/write magnetic head positioned to read and write data on said value track,
said control circuit means being operative
during a value track reading time period to process the output of read element on said read/write magnetic head to read the current value data on said value data track and to detect the position of any holes previously placed therein;
during a value track validating time period to check the correlation between said current value data read from said value data track and the position of an extreme one of said detected holes to determine if said current value data is valid;
during a value track writing time period to write a sequence of ZERO data values on said value data track until the data value in said tachometer counter register indicates that said data card has been driven to a position that the hole value region of said data card has bee scanned past said read/write head and thereafter operating said write element on said read/write magnetic head to write value data bits on said value data track using the data values in said tachometer count register to accurately control the effective data bit signal length on said value data track;
during said hole punching time period to decide whether said new value data written on said value data track requires the punching of a hole at a new location on said value indicating gage, and if a new hole is required to set said punch location count corresponding to the required location for said new hole.

12. Apparatus as claimed in claim 11, adapted for selectively swallowing said data card, and wherein
said card-in/out slit is located at an upper portion of said cylindrical card guide path section;
said card guide means further defines a card swallow path section including a card swallow slit located at a position on said cylindrical card guide path section separated from said entrance slit;
and said card guide means further includes:
a read capture claw means having a guide finger portion located at said card swallow slit and movable between a card capture position and a card swallow position;
spring biasing means for biasing said guide finger portion of said read capture claim means toward said card swallow position; and
actuator means for selectively moving said guide finger portion of said read capture claw means to said card capture position thereby to capture said data card in said cylindrical card guide path section and to smoothly guide said captured data card at the location of said card swallow slit;
said control means being additionally coupled to said actuator means and being
further operative during said card capture time period to respond to said card-in sensor means to turn on said actuator means to position said read capture claw means in said card capture position prior to operating said drive means in a forward direction to drive said data card into said cylindrical card guide path section; and
operative during a card swallow time period to turn off said actuator means thereby to return said read capture claw means to said card swallow position and to operate said drive means in a forward direction to drive said data card through said card swallow slit;
said control means invoking said card swallow time period during said value track validating time period when said current value data read from said value data track does not correlate with the position of said extreme one of said detected holes so that said invalid data card will thereafter be swallowed.

13. Apparatus as defined in claim 9 wherein said means for producing a magnetic field includes a separate oscillator operating at said first predetermined frequency connected to each of said four exciting coils whereby the produced magnetic exciting fields are asynchronous.

14. A portal for automatically exciting and reading a passive transponder type tag, which is excited by an inductively coupled signal of a first predetermined frequency and which simultaneously produces a magnetic field and an electrostatic field modulated with a digitally coded identifying signal, while the device is moving along a substantially horizontal conveyor belt, said portal comprising:
a rectangular frame for placement around a portion of a substantially horizontal conveyor belt in a direction transverse to the direction of movement of the conveyor belt;
means for producing a magnetic field of said first predetermined frequency within the interior of said frame said means including first, second, third and fourth exciter coils mounted respectively on an upper, a lower and respective side panels forming the walls of said frame, and oscillator and driver circuit means, connected to each of said exciter coils, for producing a signal of said first predetermined frequency;
a curtain, formed of a plurality of spaced flexible rectangular flaps of non-conductive material suspended from said upper panel disposed within said frame, extending in a direction transverse to the direction of movement of the conveyor belt, and being of a length such that at least one of said flaps will be contacted and deflected by an object moving along the conveyor belt;

a pickup coil, serving as a magnetic field receiving antenna, and an electrostatic field receiving antenna disposed in each of said flaps;

and receiver means, connected to each of said pickup coils and of said electrostatic field receiving antennas, for detecting a coded signal of the second frequency received by any of said pickup coils and electrostatic receiving antennas.

15. A portal according to claim 14 further comprising a respective further pickup coil serving as a magnetic field receiving antenna disposed on each of said panels of said frame adjacent respective said exciter coils, with the axes of said further pickup coils being orthogonal to the axes of said pickup coil in said flaps.

16. A portal according to claim 15 wherein said pickup coil in said flaps are disposed near the center of the length of said flaps.

17. A portal according to claim 15 wherein each of said electrostatic receiving antennas is a length of wire extending along the length of a respective flap.

18. A portal according to claim 17 wherein each said flap contains two of said electrostatic antennas which extend along the length of the respective flap adjacent the respective longitudinal edges of a respective flap.

19. A portal according to claim 15 further comprising a respective further exciter coil disposed in each flap adjacent the lower end of the respective flap and oriented orthogonal to said first, second, third and fourth exciter coils, and wherein each said further exciter coil is connected to said oscillator and driver circuit means.

20. A portal according to claim 19 wherein said oscillator and driver circuit means includes a respective separate oscillator and driver circuit for at least each of said first, second, third and fourth exciter coils, whereby at least said first, second, third and fourth exciter coils are asynchronously driven.

21. A portal according to claim 19 wherein said pickup coil in each of said flaps is disposed near the center of the length of each flap; and further comprising another magnetic field pickup coil disposed in each flap within and concentric with the adjacent said further exciter coil, and connected in parallel with the associated said pickup coil in a respective flap.

22. A portal according to claim 15 wherein said first, second, third and fourth exciter coils are flat loop coils, with the two of said pickup coils on said side panels being oriented parallel to one another and orthogonal to the two of said pickup coils on said top and bottom surfaces which are likewise parallel to one another.

23. A portal according to claim 21 wherein each of said pickup coils mounted on said panels of said frame is concentric with and disposed within the adjacent one of said exciter coils.

24. A portal according to claim 14 wherein said oscillator and driver circuit means includes a respective separate oscillator and driver circuit for each of said first, second, third and fourth exciter coils.

25. A portal according to claim 15 wherein said means for receiving and decoding includes a separate receiver connected to each of said pickup coils.

26. A portal according to claim 25 wherein: said curtain contains four of said flaps, and wherein said means for receiving and decoding includes a respective separate receiver connected to said electrostatic antennas of the two inner of said flaps and to said electrostatic antennas of the two outer of said flaps.

27. A portal according to claim 15 further comprising a pre-reader comprising a rectangular panel containing a fifth exciter coil and a further magnetic field pickup coil disposed in front of said frame in the direction of travel of the conveyor belt and with said rectangular panel being positioned so that it is substantially coplanar and parallel to said lower panel of said frame; said fifth exciter coil being an elongated loop coil extending in a direction transverse to the direction of travel of the conveyor belt and of a width in the direction of travel of the conveyor belt to produce a magnetic field transverse to the direction of conveyor belt travel which is narrow relative to the magnetic fields produced by said first, second, third and fourth exciting coils; an oscillator producing a signal of said first predetermined frequency connected to said fifth exciter coil via a driver circuit; and a separate receiver means connected to said further pickup coil for detecting a coded signal of said second predetermined frequency received by said further pickup coil.

* * * * *

UNITED STATES PATENT AND TRADEMARK OFFICE
CERTIFICATE OF CORRECTION

PATENT NO. : 5,221,831

DATED : June 22, 1993

INVENTOR(S) : Theodore D. Geiszler

It is certified that error appears in the above-indentified patent and that said Letters Patent is hereby corrected as shown below:

The title page should be deleted to appear as per attached title page.

Columns 1-14 should be delete to appear as per attached columns 1-12 therefor.

Signed and Sealed this

Twenty-second Day of August, 1995

Attest:

BRUCE LEHMAN

Attesting Officer    Commissioner of Patents and Trademarks

United States Patent [19]

Geiszler

[11] Patent Number: 5,221,831
[45] Date of Patent: Jun. 22, 1993

[54] FLAP-TYPE PORTAL READER

[75] Inventor: Theodore D. Geiszler, Los Gatos, Calif.

[73] Assignee: Indala Corporation, San Jose, Calif.

[21] Appl. No.: 798,713

[22] Filed: Nov. 29, 1991

[51] Int. Cl.$^5$ .......................... G06K 9/00; H04Q 9/00
[52] U.S. Cl. ................................... 235/440; 235/449; 235/443; 340/572; 340/825.54
[58] Field of Search ............... 235/440, 439, 449, 443, 235/385; 340/572, 825.54, 825.35

[56] References Cited

U.S. PATENT DOCUMENTS

| | | | |
|---|---|---|---|
| 3,983,578 | 9/1976 | Price | 360/2 |
| 4,322,614 | 3/1982 | Sloan et al. | 235/475 |
| 4,613,747 | 9/1986 | McCarthy | 235/477 |
| 4,673,932 | 6/1987 | Ekchian et al. | 340/825.54 |
| 4,704,518 | 11/1987 | Brunn et al. | 235/480 |
| 4,788,419 | 11/1988 | Walters et al. | 235/381 |
| 4,818,855 | 4/1989 | Mongeon et al. | 235/440 |
| 4,862,160 | 8/1989 | Ekchian et al. | 340/825.54 |
| 5,099,227 | 3/1992 | Geiszler et al. | 235/440 |
| 5,120,947 | 6/1992 | Petch et al. | 235/476 |
| 5,146,204 | 9/1992 | Zhou et al. | 340/572 |

FOREIGN PATENT DOCUMENTS

| | | | |
|---|---|---|---|
| 0131812 | 1/1985 | European Pat. Off. | 360/2 |
| 2-28786 | 1/1990 | Japan | 235/475 |

Primary Examiner—Carolyn E. Fields
Assistant Examiner—Drew A. Dunn
Attorney, Agent, or Firm—Spencer, Frank & Schneider

[57] ABSTRACT

A portal for automatically exciting and reading a passive transponder type tag, which is excited by an inductively coupled signal of a first predetermined frequency and which simultaneously produces a magnetic field and an electrostatic field modulated with a digitally coded identifying signal, while the tag is moving along a substantially horizontal conveyor belt. The portal comprises: a rectangular frame for placement around a portion of a substantially horizontal conveyor belt in a direction transverse to the direction of movement of the conveyor belt; first, second, third and fourth exciter coils, mounted respectively on an upper, a lower and respective side panels forming the walls of the frame, for producing a magnetic field of the first predetermined frequency within the interior of the frame; a curtain formed of a plurality of spaced flexible rectangular flaps of non-conductive material which are suspended from the upper panel within the frame, extend in a direction transverse to the direction of movement of the conveyor belt, and are of a length such that at least one flaps will be contacted and deflected by an object moving along the conveyor belt; a pickup coil, serving as a magnetic field receiving antenna, and an electrostatic field receiving antenna disposed in each flap; and a receiver circuit, connected to each of the magnetic pickup coils and the electrostatic field receiving antennas, for detecting a coded signal of the second frequency received by any of the pickup coils and the electrostatic field receiving antennas.

27 Claims, 3 Drawing Sheets

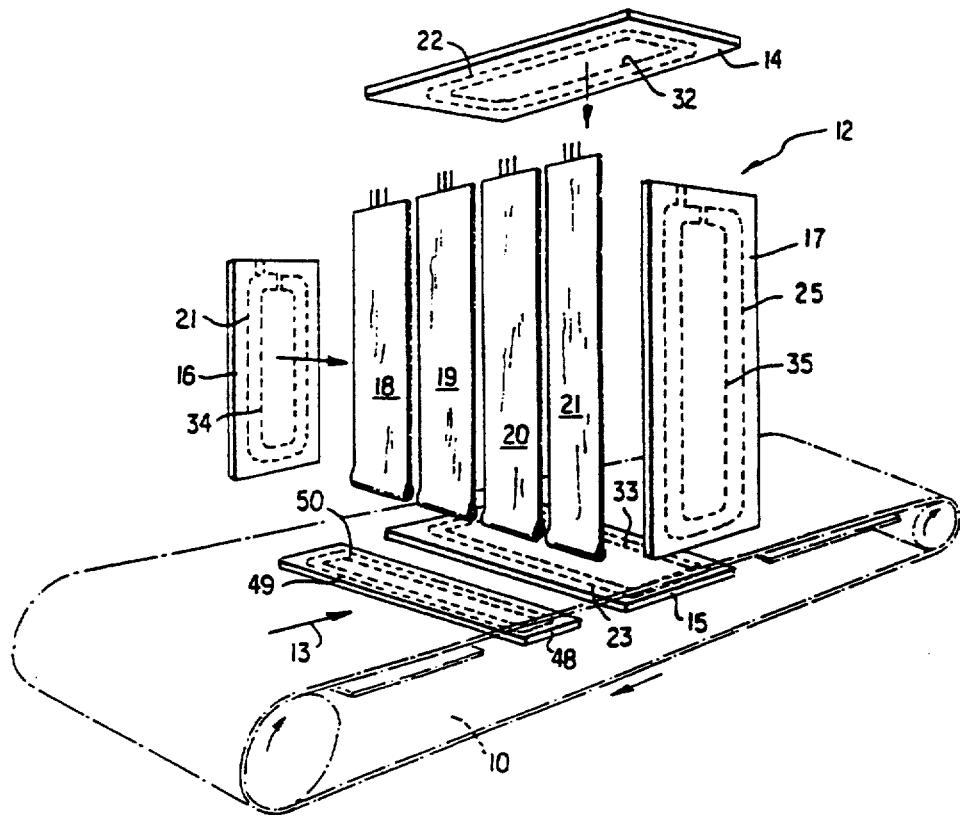

FLAP-TYPE PORTAL READER

BACKGROUND OF THE INVENTION

The present invention relates to an arrangement in the form of a portal positioned along a pathway for reading a transponder type device or tag attached to an object moving along the pathway through the portal. More particularly, the present invention relates to a portal reading arrangement for reading a preferably passive transponder type device or tag which is excited by an inductively coupled magnetic field of a first predetermined frequency to produce a magnetic and/or an electrostatic field of a second predetermined frequency modulated with a coded identifying signal which is inductively received and decoded by a receiver. Proximity type systems generally operating in this manner are disclosed for example in commonly owned U.S. Pat. No. 4,818,855 and copending allowed U.S. application 07/453,721, filed Dec. 18th, 1989 now U.S. Pat. No. 5,099,227, the subject matter of which is incorporated herein by reference.

It is known to use systems of the above general type for the identification of objects moving along a pathway, for example, a conveyor belt or an animal walkway, for the purpose of identifying and/or controlling the movement of the object along the pathway as a result of the readout identification. In such systems, the transponder type device or tag is generally affixed to the object with a known orientation and position, and one or more readers are positioned along the pathway, for example above, below and/or to the side of the pathway, depending on the desired or known orientation of the tag on the object. While these systems operate satisfactorily when the orientation and/or position of the tag on the object is generally known, reading problems may occur if the tag is randomly oriented or randomly positioned. These reading problems may be caused for example because the tag has not been excited to produce an output signal, or because the output signal received by the receiving antenna is too weak. These problems generally occur because of the directional nature of the coupling mechanisms involved, and in particular the inductive magnetic field coupling used to excite the transponder or tag and/or to provide the received output signal. Additional reading problems can result due to the size, and thus the positioning of the tags relative to the readers, and/or due to the material from which the object is formed. For example, in the case of a metal object with a random orientation, the tag may be effectively shielded from the reading devices.

One type of pathway or conveyor system wherein automatic reading of tags affixed to objects moving along the conveyor would be most desirable is the baggage handling conveyor systems of the type commonly used, for example, by airlines at airports. As can easily be appreciated, the baggage or luggage transported by such conveyor systems is random in shape and material of construction, and is randomly oriented on the conveyor, often with little space between individual pieces of luggage. Thus, identifying tags fastened to the individual piece of luggage, for example tags indicating destination, flight or ownership, are likewise randomly oriented and positioned, thus rendering automatic reading of the tags most difficult.

At the present time identifying tags affixed to luggage in luggage conveying systems are either manually read or semimanually read by means of hand held optical scanners. Obviously, it would be desirable to provide an automatic system, and in particular a portal reader which could automatically read transponder type devices or tags containing the desired information irrespective of the orientation of the tags in such a baggage conveyor system. However, to be applicable, such a portal reader should be able to read the tags on the first try with a substantial degree of accuracy, e.g. close to 100% and the tags must be read in the same sequence as they appear on the conveyor. Additionally, the reader must be capable of reading the tags in all orientations, even if the tags disposed under the luggage, and should be capable of readings tags disposed on metal luggage, which tends to be most difficult in view of the shielding effect produced by the metal of the luggage.

SUMMARY OF THE INVENTION

It is an object of the present invention to provide an improved reading device for reading transponder type devices or tags of the above identified type attached to an object moving along a pathway through the portal.

It is a further object of the invention to provide an improved portal type reading device which is capable of reading transponder type devices or tags using proximity detection techniques while the tags are attached on an object moving along a pathway through the portal irrespective of the orientation of the tag.

The above objects are generally achieved according to a first aspect of the invention by an apparatus for automatically reading a passive transponder type tag, which is responsive to receipt of a magnetic exciting field of a first predetermined frequency to produce at least one of a magnetic and an electrostatic field of a second different predetermined frequency modulated by a digitally coded identifying signal, while the tag is attached to an object moving along a given pathway; which apparatus comprises: means for producing a magnetic exciting field of the first predetermined frequency along a portion of the length of the pathway; a curtain, formed of a plurality of flexible flaps of nonconductive material, suspended from above the portion of the pathway and extending across the pathway, with the plurality of flaps being positioned, and being of a length, such that at least one of the flaps will be contacted and deflected by an object having an attached tag moving along the pathway; at least one of an electrostatic field receiving antenna and a magnetic field receiving antenna disposed in each of the flaps; and means connected to each of the receiving antennas for receiving and decoding a signal of the second predetermined frequency received by the respective the antennas.

Preferably the tag simultaneously produces both a magnetic field and an electrostatic field modulated with the coded identifying signal, and at least some of the flaps contain both a magnetic field receiving antenna and an electrostatic field receiving antenna.

According to features of this aspect of the invention each electrostatic antenna comprises a length of wire extending along the length of the respective flap and connected at its upper end to the means for receiving, each magnetic field receiving antenna includes a coil disposed in a respective flap, with respective leads extending along the length of the respective flap and connecting the respective ends of the coil to the means for receiving, at least some of the flaps further include an excitor coil for the means for producing a magnetic field of the first predetermined frequency.

Moreover, according to the preferred feature of the invention, the pathway is a conveyor belt for conveying an object to which the tag is attached and may be randomly oriented, and the means for producing a magnetic exciting field comprises at least two exciting coils disposed orthogonally about the portion of the conveyor belt for generating respective magnetic fields disposed orthogonal to the direction of movement of the conveyor belt.

The above objects are achieved according to a preferred embodiment of the invention by a portal for automatically exciting and reading a passive transponder type tag, which is excited by an inductively coupled signal of a first predetermined frequency and which simultaneously produces a magnetic field and an electrostatic field modulated with a digitally coded identifying signal, while the device is moving along a substantially horizontal conveyor belt, which portal comprises: a rectangular frame for placement around a portion of a substantially horizontal conveyor belt in a direction transverse to the direction of movement of the conveyor belt; means for producing a magnetic field of the first predetermined frequency within the interior of the frame with this means including first, second, third and fourth exciter coils mounted respectively on an upper, a lower and respective side panels forming the walls of the frame, and oscillator and driver circuit means, connected to each of the exciter coils, for producing a signal of the first predetermined frequency; a curtain, formed of a plurality of spaced flexible rectangular flaps of non-conductive material suspended from the upper panel disposed within the frame, extending in a direction transverse to the direction of movement of the conveyor belt, and being of a length such that at least one of the flaps will be contacted and deflected by an object moving along the conveyor belt; a pickup coil, serving as a magnetic field receiving antenna, and an electrostatic field receiving antenna disposed in each flap; and receiver means, connected to each pickup coil and each electrostatic field receiving antenna, for detecting a coded signal of the second frequency received by any of the pickup coils and electrostatic receiving antennas.

Preferably, a respective further pickup coil, serving as a magnetic field receiving antenna, is disposed on each of the panels of the frame adjacent respective ones of the exciter coils, with the axes of the further pickup coils being orthogonal to the axes of the pickup coil in the flaps.

According to features of the preferred embodiment of the invention, the above mentioned pickup coils in the flaps are disposed near the center of the length of the flaps; a respective further exciter coil may be disposed in each flap adjacent the lower end of the respective flap and oriented orthogonal to said first, second, third and fourth exciter coils, and connected to said oscillator and driver circuit means; the oscillator and driver circuit means includes a respective separate oscillator and driver circuit for at least each of the first, second, third and fourth exciter coils, whereby at least the first, second, third and fourth exciter coils are asynchronously driven; and another magnetic field pickup coil may be disposed in each flap within and concentric with the adjacent further exciter coil, and connected in parallel with the associated pickup coil in the respective flap.

According to still further features of the preferred embodiment of the invention, the first, second, third and fourth exciter coils are flat loop coils, with the two of the pickup coils on the side surfaces being oriented parallel to one another and orthogonal to the two of the pickup coils on the top and bottom surfaces which are likewise parallel to one another; each of the pickup coils mounted on the panels of the frame is concentric with and disposed within the adjacent one of the exciter coils; the means for receiving and decoding includes a separate receiver connected to each of the pickup coils, and the curtain contains four flaps, with the means for receiving and decoding including a respective separate receiver connected to the electrostatic antennas of the two inner flaps and to the electrostatic antennas of the two outer flaps.

Finally, according to still a further feature of the invention, a pre-reader comprising a rectangular panel containing a further exciter coil for the first predetermined frequency and a further magnetic field pickup coil for receiving a coded signal of the second predetermined frequency may be disposed in front of the frame in the direction of travel of the conveyor belt and with the rectangular panel being positioned so that it is substantially coplanar and parallel to the lower panel of the frame, with this further exciter coil being an elongated loop coil extending in a direction transverse to the direction of travel of the conveyor belt and of a width in the direction of travel of the conveyor belt to produce a magnetic field transverse to the direction of conveyor belt travel which is narrow relative to the magnetic fields produced by the first, second, third and fourth exciting coils.

BRIEF DESCRIPTION OF THE DRAWINGS

FIG. 1 is a schematic isometric view of a preferred embodiment of a flap-reader type portal according to the invention for a conveyor belt with the panels of the portal shown in an exploded view for the sake of clarity.

FIG. 2 is a schematic isometric view of the flap reader type portal of FIG. 1 showing the details of the content of the flaps.

FIG. 3 is a schematic circuit showing the preferred exciting circuitry for the magnetic field exciting coils.

FIG. 4 is a block diagram of the preferred arrangement of the receiving circuitry for the portal of FIGS. 1 and 2.

DETAILED DESCRIPTION OF THE PREFERRED EMBODIMENTS

Referring now to FIGS. 1 and 2, there is shown a conveyor 10 provided with a portal type reader 12 according to the present invention for the purpose of the proximity reading tags attached to luggage, which tags are of the type which are excited by a magnetic field of a first predetermined frequency and which produce a carrier signal of a second predetermined frequency modulated with an identifying code stored in the tag and which simultaneously radiates or transmits the modulated carrier signal by both a magnetic coupling field and an electrostatic coupling field. Such a tag is disclosed in the above identified allowed copending U.S. application No. 07/453,271, filed Dec. 18th, 1989 now U.S. Pat. No. 5,099,227.

The portal reader 12 is provided as a rectangular frame disposed transverse to the direction of movement 13 of the conveyor 10. The frame 12 is essentially composed of four rectangular panels, and in particular an upper panel 14 disposed above the conveyor belt 10, a lower panel 15 disposed below the conveyor belt 10.

and opposed side panels 16 and 17 disposed on either side of the conveyor belt 10. Although the panels 14-17, in FIG. 2, are shown as in fact constituting the frame, it is to be understood that this is not absolutely required, i.e. the panels may be attached to further supporting structures (not shown) which maintain the panels in their indicated orientation, i.e. opposed panels being parallel to one another to form a rectangular frame. The portal reader 12 further includes a curtain which extends transverse to the direction of movement 13 of the conveyor belt 10 and which is formed of a plurality of elongated rectangular strips or flaps 18-21 of a flexible non-conductive material, for example rubber or a plastic such as vinyl, which are suspended from the upper panel 14 (or the supporting framework) within the frame formed by the four rectangular panels 14-17. The length of the flaps 18-21 and the number of such flaps, is such that at least one of the flaps will be contacted and deflected by an object moving along the surface of the conveyor 10.

To produce an exciting field in the area of the portal 12 for a tag moving along the conveyor belt 10, each of the panels 14-17 is provided with a large diameter exciter coil 22-25, respectively, with the coils being shown schematically. Each of the coils 22-25 is essentially a flat coil or loop of wire, with the opposing pairs of coils 22-23 and 24-25 being disposed parallel to one another and producing magnetic fields within the portal 12 which extend orthogonal to the direction of movement 13 of the conveyor belt 10. Although each of the exciter coils 22-25 may be a simple loop of wire which is connected to an oscillator and driver circuit for providing an exciting signal of the first predetermined or exciting frequency, as shown in FIG. 3 for the exciter coil 22 by way of example, each exciter coil 22-25 is preferably a transformer with coaxial and closely coupled loop type primary and secondary windings 28 and 29, with the primary winding 28 being connected to the oscillator and driver circuit 30 for providing the exciting frequency signal, e.g. 125 kHz, and with the secondary winding 29 being connected in parallel with a capacitor 31 to form a resonant circuit at the exciting frequency in order to provide better control for the power of the exciting fields. Although it is possible to excite all of the exciter coils 22-25 from a common oscillator and driver circuit 30, experience has shown that with such an arrangement, as well as with an arrangement wherein opposite exciter coils, for example, coils 25 and 26, are excited with in-phase signals, a so-called "hole" in the exciting field may result in the center of the portal 12, so that tags passing through the portal 12 in this position are not consistently activated. Accordingly, preferably each of the exciting coils 22-25 is connected to a separate respective oscillator and driver circuit 30, each producing the same exciting frequency, with the respective oscillator and driver circuits 30 being operated asynchronously. While such a mode of operation results in a continuously changing field strength due to the interaction of the out of phase exciting fields, it has been found that this mode of operation does assure that there is always sufficient power available from one of the exciting coils 22-25 to activate a tag located within the portal 12 regardless of its location. It should be noted that operating the fields in this manner may cause a tag to be turned on sequentially by more than one coil as it passes through the field. However, the arrangement does assure that no so-called "holes" in the exciting field within the portal 12 are present at any given time.

In order to detect the modulated magnetic field produced by an excited tag disposed within the portal 12, each of the panels 14-17 is provided with a magnetic field receiving antenna or coil 32-35 which is of a smaller diameter and concentric with the respectively associated exciter coil 22-25. Each of the receiving coils 32-35 is connected to a respective receiver arrangement, responsive to the produced carrier frequency, for detecting and decoding the received signal. However, in view of the directional nature of the magnetic coupling mechanism involved, using only the four receiving or pickup coils 32-35 results in the problem that tags located in the center of the portal may not be read. That is, while the tag may be activated or excited, its magnetic output field may not be seen by the receiving antennas or coils 32-35. This problem may, in addition to being caused by the orientation of the tag, be a result of the distance of the tags from the receiving coils or antennas and possibly cancellation of the effect of the receiving coils or antennas 32-35 in the center of the portal.

To avoid such a problem, each of the flaps 18-21 is provided, as shown in FIG. 2, with a receiving antenna for receiving the modulated carrier signal radiated by a tag, with the receiving antennas in the respective flaps being either a magnetic field receiving antenna (e.g. coil) or an electrostatic field receiving antenna (e.g., a length of straight wire). Preferably, as shown in FIG. 2, each of the flaps 18-21 is provided with both a magnetic field receiving antenna or coil 36-39, respectively, and with a pair of electrostatic field receiving antennas or lengths of wire 40-40', 41-41', 42-42' and 43-43' which extend along the respective longitudinal edges of the respective flaps 18-21. As shown, each of the magnetic field receiving antennas or coils 36-39 is preferably disposed in approximately the center of the respective flap 18-21 with the coils being oriented orthogonally to the magnetic field pickup antennas 32-35 in the panels 14-17.

As further shown in FIG. 2, and in order to ensure the ability to excite and read tags which may be attached to metal objects or pieces of luggage, and thus might tend to be shielded from the remaining sensing and receiving antenna coils, each of the flaps 18-21 is additionally provided adjacent its lower end with a further receiving coil 36'-39', respectively which is connected in parallel and similarly oriented with the associated receiving coil 36-39, and with a respective concentric exciter coil 44-47 which preferably are similar to the exciting coils 22-25 on the side panels. As can be seen, each of the exciting coils 44-47 is oriented orthogonally to the exciting coils 22-25, and thus produces fields orthogonal to those produced by the exciting coils 22-25, increasing the probability of a tag being activated regardless of its orientation. The exciter coils 44-47 may, like the coils 22-25, each be connected to a respective oscillator and driver circuit 30, or can be connected to a common oscillator and driver circuit 30.

Although the flap type portal reader as discussed above will excite tags passing through the portal irrespective of the orientation and/or type of luggage to which attached, as indicated above a tag may be read several times within the portal. Since it may occur in a luggage conveyor system that the pieces of luggage are closely spaced, it could occur that the tags of two different pieces of luggage are simultaneously within the portal 12 and being read. Since it is important in a luggage conveyor system that the sequence of the luggage being conveyed be known, such a dual reading presents a problem. To attempt to minimize such a problem, according to a further feature of the invention as shown in FIGS. 1 and 2, the portal 12 is provided with a pre-reader including a further rectangular panel 48 which, in a manner similar to panels 14–17, contains an exciting coil 49 which is concentric with and surrounds a reading coil or antenna 50. This panel 48 is disposed in front of the frame or portal 12 in the direction of travel 13 of the conveyor belt 10, and is positioned so that it is substantially coplanar and parallel to the lower panel 15. Moreover, the panel 48, and thus the exciting coil 49, have a width in the direction of travel 13 of the conveyor belt 10 to produce a magnetic field which is narrow relative to the magnetic fields, produced by the exciter coils 22–25. The exciter coil 49 is likewise connected to an oscillator and driver circuit 30 operating at the exciting frequency and the read signal received by the reading antenna 50 is detected and decoded in the normal manner to provide an additional source of information, if necessary, in the event of an ambiguity in the signals read by the receiving antennas of the portal 12 itself.

To process the signals received by the various receiving antennas as shown in FIG. 4, each of the nine magnetic field receiving antennas 32–34, 36–39 and 50 of the flap type portal reader and prereader shown in FIGS. 1 and 2 is connected via a respective preamplifier 51, a respective receiver 52 for detecting the modulation, and a respective microprocessor 53 for decoding the coded information to a host computer 54 for processing of the decoded information and for controlling downstream operations of the conveyor system. It should be noted, however, that instead of respective receivers 52 and microprocessors 53 for each of the magnetic field receiving antennas 32–39, multiplexing techniques may be utilized to reduce the number of receivers and microprocessors. For example, a common receiver 52 and microprocessor 53 may be utilized for the receiving antennas 32–35 of the panels 14–17 and a single further receiver 52 microprocessor 53 for the magnetic field receiving antennas 36–39 of the flaps 18–21. With regard to the electrostatic antennas in the flaps 18–21, while separate signal paths to the computer may likewise be utilized, preferably as shown in FIG. 4, each pair of electrostatic antennas 40–40', 41–41', 42–42' and 43–43' are connected together at their upper ends as shown. Thereafter, the connected pair 40–40' and the connected pair 43–43' associated with the two outer flaps 18 and 21 are connected via a common preamplifier 55, receiver 56 and microprocessor 57 to the computer 54 while the antenna pairs 41–41' and 42–42' are connected together and via a further preamplifier 58, receiver 59 and microprocessor 60 to the computer 54.

Although the flap type portal reader according to the invention has been described with particular applicability for a luggage conveyor system, it is to be understood that various modifications of the preferred arrangement are possible depending on the particular use of the flap type portal reader. For example, for certain type applications it may be possible to do without the exciting coils and magnetic field receiving antennas in the panels 14–17, i.e. to use only the exciting coils and the receiving antennas in the flaps 18–21. Additionally, the disclosed flap type portal reader may, for example, be utilized without the exciter coils 44–47 in the flaps and/or with different arrangements of the receiving antennas dependent on the particular application. Accordingly, various modifications, changes and adaptations are intended to be comprehended within the meaning and range of equivalents of the appended claims.

What is claimed:

1. Apparatus for automatically reading a passive transponder type tag, which is responsive to receipt of a magnetic exciting field of a first predetermined frequency to produce at least one of a magnetic and an electrostatic field of a second different predetermined frequency modulated by a digitally coded identifying signal, while the tag is attached to an object moving along a given pathway; said apparatus comprising:
   means for producing a magnetic exciting field of said first predetermined frequency along a portion of the length of the pathway;
   a curtain, formed of a plurality of flexible flaps of non-conductive material, suspended from above said portion of said pathway and extending across said pathway, with said plurality of flaps being positioned, and being of a length, such that at least one of said flaps will be contacted and deflected by an object having an attached transponder moving along said pathway;
   at least one of an electrostatic field receiving antenna and a magnetic field receiving antenna disposed in each of said flaps; and
   means connected to each of said receiving antennas for receiving and decoding a signal of the second predetermined frequency received by the respective said antennas.

2. Apparatus as defined in claim 1 wherein: the transponder type device simultaneously produces both a magnetic field and an electrostatic field modulated with the coded identifying signal; and at least some of said flaps contain both a magnetic field receiving antenna and an electrostatic field receiving antenna.

3. Apparatus as defined in claim 1 wherein each electrostatic antenna comprises a length of wire extending along the length of a respective flap and connected at its upper end to said means for receiving.

4. Apparatus as defined in claim 1 wherein each magnetic field receiving antenna comprises a coil disposed in a respective flap, and respective leads extending along the length of the respective flap and connecting the respective ends of said coil to said means for receiving.

5. Apparatus as defined in claim 4 wherein: said transponder type device simultaneously produces both a magnetic field and an electrostatic field modulated with the coded signal; at least some of said flaps contain both a magnetic field receiving antenna and an electrostatic field receiving antenna; and said electrostatic field receiving antenna is a length of wire extending along the length of the associated flap.

6. Apparatus as defined in claim 5 wherein at least some of said flaps further include an excitor coil for said means for producing a magnetic field of said first predetermined frequency.

7. Apparatus as defined in claim 1 wherein said flaps are laminated sheets of plastic with the associated said antennas being disposed between the plastic sheets.

8. Apparatus as defined in claim 1 wherein: said pathway is a conveyor belt for conveying an object to which the tag is attached and is randomly oriented; and said means for producing a magnetic exciting field comprises at least two exciting coils disposed orthogonally about said portion of said conveyor belt for generating respective magnetic fields disposed orthogonal to the direction of movement of said conveyor belt.

9. Apparatus as defined in claim 8 including four of said orthogonally disposed exciting coils, disposed respectively on both sides and above and below said conveyor at said portion of said conveyor belt, for generating respective magnetic fields in directions orthogonal to the direction of movement of said conveyor belt.

10. Apparatus as defined in claim 9 wherein said means for producing a magnetic exciting field further comprises a respective further exciting coil disposed in each flap for generating a magnetic field in a direction substantially parallel to the direction of movement of the conveyor belt.

11. Apparatus as defined in claim 10 wherein said exciting coils disposed in said flaps are disposed adjacent the lower ends of said flaps.

12. Apparatus as defined in claim 9 further comprising: a respective further pickup coil disposed adjacent and concentric with each of said orthogonally disposed exciting coils and connected to said means for receiving and decoding.

13. Apparatus as defined in claim 9 wherein said means for producing a magnetic field includes a separate oscillator operating at said first predetermined frequency connected to each of said four exciting coils whereby the produced magnetic exciting fields are asynchronous.

14. A portal for automatically exciting and reading a passive transponder type tag, which is excited by an inductively coupled signal of a first predetermined frequency and which simultaneously produces a magnetic field and an electrostatic field modulated with a digitally coded identifying signal, while the device is moving along a substantially horizontal conveyor belt, said portal comprising:
a rectangular frame for placement around a portion of a substantially horizontal conveyor belt in a direction transverse to the direction of movement of the conveyor belt;
means for producing a magnetic field of said first predetermined frequency within the interior of said frame said means including first, second, third and fourth exciter coils mounted respectively on an upper, a lower and respective side panels forming the walls of said frame, and oscillator and driver circuit means, connected to each of said exciter coils, for producing a signal of said first predetermined frequency;
a curtain, formed of a plurality of spaced flexible rectangular flaps of non-conductive material suspended from said upper panel disposed within said frame, extending in a direction transverse to the direction of movement of the conveyor belt, and being of a length such that at least one of said flaps will be contacted and deflected by an object moving along the conveyor belt;
a pickup coil, serving as a magnetic field receiving antenna, and an electrostatic field receiving antenna disposed in each of said flaps;
and receiver means, connected to each of said pickup coils and of said electrostatic field receiving antennas, for detecting a coded signal of the second frequency received by any of said pickup coils and electrostatic receiving antennas.

15. A portal according to claim 14 further comprising a respective further pickup coil serving as a magnetic field receiving antenna disposed on each of said panels of said frame adjacent respective said exciter coils, with the axes of said further pickup coils being orthogonal to the axes of said pickup coil in said flaps.

16. A portal according to claim 15 wherein said pickup coils in said flaps are disposed near the center of the length of said flaps.

17. A portal according to claim 15 wherein each of said electrostatic receiving antennas is a length of wire extending along the length of a respective flap.

18. A portal according to claim 17 wherein each said flap contains two of said electrostatic antennas which extend along the length of the respective flap adjacent the respective longitudinal edges of a respective flap.

19. A portal according to claim 15 further comprising a respective further exciter coil disposed in each flap adjacent the lower end of the respective flap and oriented orthogonal to said first, second, third and fourth exciter coils, and wherein each said further exciter coil is connected to said oscillator and driver circuit means.

20. A portal according to claim 19 wherein said oscillator and driver circuit means includes a respective separate oscillator and driver circuit for at least each of said first, second, third and fourth exciter coils, whereby at least said first, second, third and fourth exciter coils are asynchronously driven.

21. A portal according to claim 19 wherein said pickup coil in each of said flaps is disposed near the center of the length of each flap; and further comprising another magnetic field pickup coil disposed in each flap within and concentric with the adjacent said further exciter coil, and connected in parallel with the associated said pickup coil in a respective flap.

22. A portal according to claim 15 wherein said first, second, third and fourth exciter coils are flat loop coils, with the two of said pickup coils on said side panels being oriented parallel to one another and orthogonal to the two of said pickup coils on said top and bottom surfaces which are likewise parallel to one another.

23. A portal according to claim 21 wherein each of said pickup coils mounted on said panels of said frame is concentric with and disposed within the adjacent one of said exciter coils.

24. A portal according to claim 14 wherein said oscillator and driver circuit means includes a respective separate oscillator and driver circuit for each of said first, second, third and fourth exciter coils.

25. A portal according to claim 15 wherein said means for receiving and decoding includes a separate receiver connected to each of said pickup coils.

26. A portal according to claim 25 wherein: said curtain contains four of said flaps, and wherein said means for receiving and decoding includes a respective separate receiver connected to said electrostatic antennas of the two inner of said flaps and to said electrostatic antennas of the two outer of said flaps.

27. A portal according to claim 15 further comprising a pre-reader comprising a rectangular panel containing a fifth exciter coil and a further magnetic field pickup coil disposed in front of said frame in the direction of travel of the conveyor belt and with said rectangular panel being positioned so that it is substantially coplanar and parallel to said lower panel of said frame; said fifth exciter coil being an elongated loop coil extending in a direction transverse to the direction of travel of the conveyor belt and of a width in the direction of travel of the conveyor belt to produce a magnetic field transverse to the direction of conveyor belt travel which is narrow relative to the magnetic fields produced by said first, second, third and fourth exciting coils; an oscillator producing a signal of said first predetermined frequency connected to said fifth exciter coil via a driver circuit; and a separate receiver means connected to said further pickup coil for detecting a coded signal of said second predetermined frequency received by said further pickup coil.

* * * * *